(12) United States Patent
Hernandez (10) Patent No.: US 8,196,949 B1
(45) Date of Patent: Jun. 12, 2012

(54) PROTECTIVE COVER FOR WEIGHT DISTRIBUTION TYPE TOWING HITCH ASSEMBLY

(76) Inventor: Luis Hector Hernandez, San Antonio, TX (US)

( * ) Notice: Subject to any disclaimer, the term of this patent is extended or adjusted under 35 U.S.C. 154(b) by 186 days.

(21) Appl. No.: 12/655,621

(22) Filed: Jan. 4, 2010

(51) Int. Cl.
*B60R 21/34* (2011.01)
(52) U.S. Cl. ....................................... 280/507
(58) Field of Classification Search .................. 280/507
See application file for complete search history.

(56) References Cited

U.S. PATENT DOCUMENTS

| | | | | |
|---|---|---|---|---|
| 2,671,675 A * | 3/1954 | Swaisgood | ................... | 280/507 |
| 6,039,339 A * | 3/2000 | Bello | ................... | 280/507 |
| 6,325,121 B1 * | 12/2001 | Hudnall | ................... | 150/166 |
| 6,332,853 B1 * | 12/2001 | Bowman | ................... | 474/146 |
| 6,412,806 B1 * | 7/2002 | Peacock | ................... | 280/507 |
| 6,857,652 B2 * | 2/2005 | Dougherty | ................... | 280/507 |
| 6,913,278 B1 * | 7/2005 | Laska | ................... | 280/507 |
| 7,014,205 B1 * | 3/2006 | Reilly | ................... | 280/507 |
| 7,703,791 B2 * | 4/2010 | Varjassy | ................... | 280/433 |
| 7,883,103 B1 * | 2/2011 | Greaves, Jr. | ................... | 280/507 |
| 2009/0058045 A1 * | 3/2009 | Trubody | ................... | 280/507 |

* cited by examiner

*Primary Examiner* — Lesley D Morris
*Assistant Examiner* — Michael Stabley
(74) *Attorney, Agent, or Firm* — Wayne J. Colton, Inc.

(57) ABSTRACT

A protective cover for use in connection with a weight distribution type towing hitch assembly includes means for encasing a weight distribution type towing hitch assembly, having both means for preventing contact injury to passersby and means for containing grease associated with the weight distribution type towing assembly; and means for securing the protective cover to the weight distribution type towing assembly. The cover is formed as a laminate of an outer layer, a grease barrier and a cushion located between the outer layer and the grease barrier. The outer layer forms a number of attachment flaps, which are provided and arranged such that in addition to providing a means for securing the protective cover to the hitch assembly also at least in part provide the means for containing grease.

16 Claims, 6 Drawing Sheets

PROTECTIVE COVER FOR WEIGHT DISTRIBUTION TYPE TOWING HITCH ASSEMBLY

FIELD OF THE INVENTION

The present invention relates to methods and apparatus for use in connection with land vehicles. More particularly, the invention relates to protective cover for use on and in connection with a weight distribution type towing hitch assembly, the protective cover being specifically adapted to preventing contact injury to passersby as well as damage to the clothing and the like of passersby.

BACKGROUND OF THE INVENTION

A common experience when towing a trailer or the like weighing more than about fifty percent of the towing vehicle's weight is the dangerous condition resulting from loss of traction and steering control and/or increased trailer swaying as occurs due to excessive tongue weight. In an important advancement in the prior art, special towing assemblies known as "weight distribution" type towing assemblies have been developed and, with proper selection and setup, largely alleviate the foregoing hazards. As a result of this benefit, weight distribution type towing assemblies have been placed into widespread use.

Figure 1:
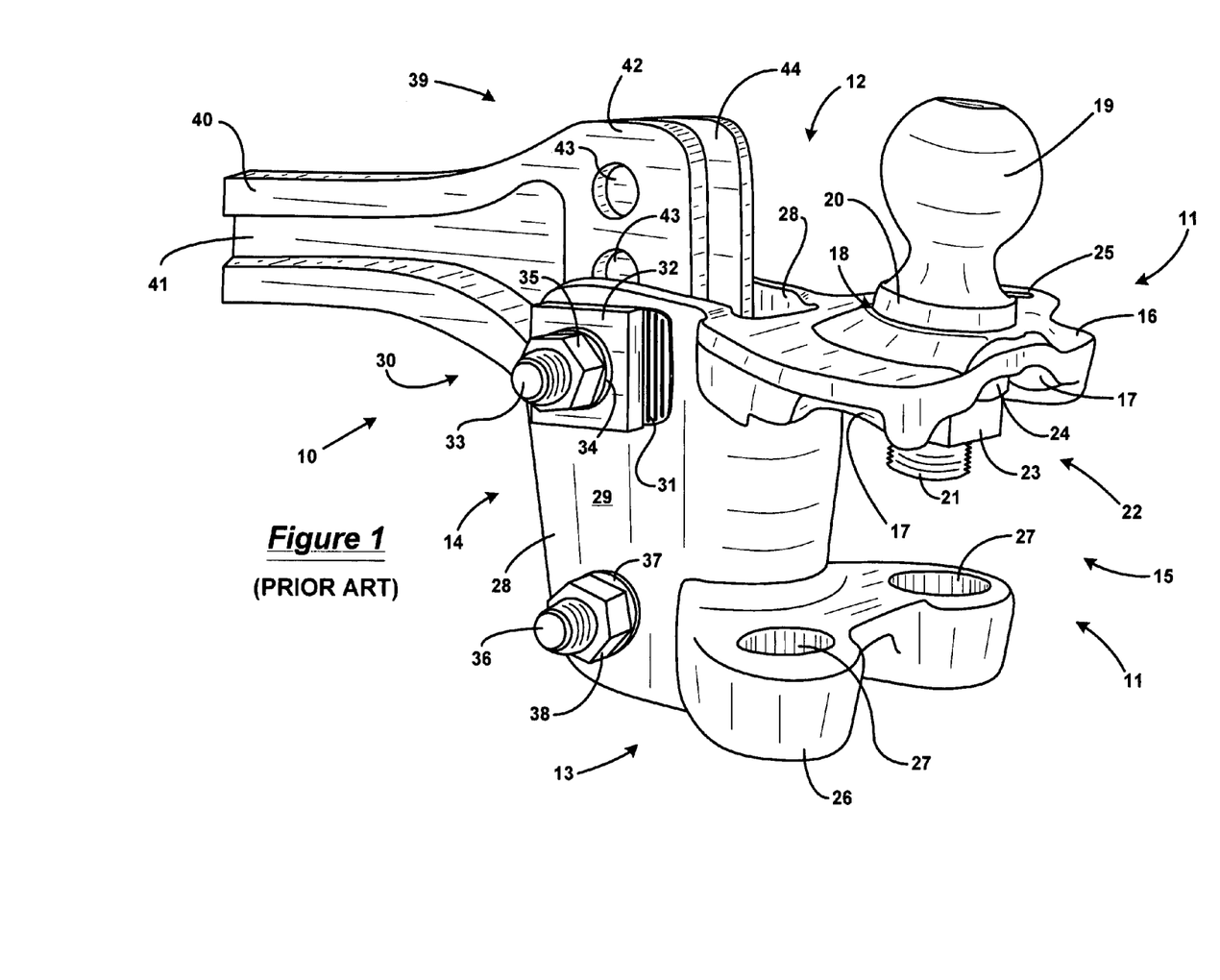
FIG. 1 shows, in a perspective view, a typical prior art weight distribution type towing hitch assembly of the general nature for which the protective cover of the present invention is intended to be used.
Figure 2:
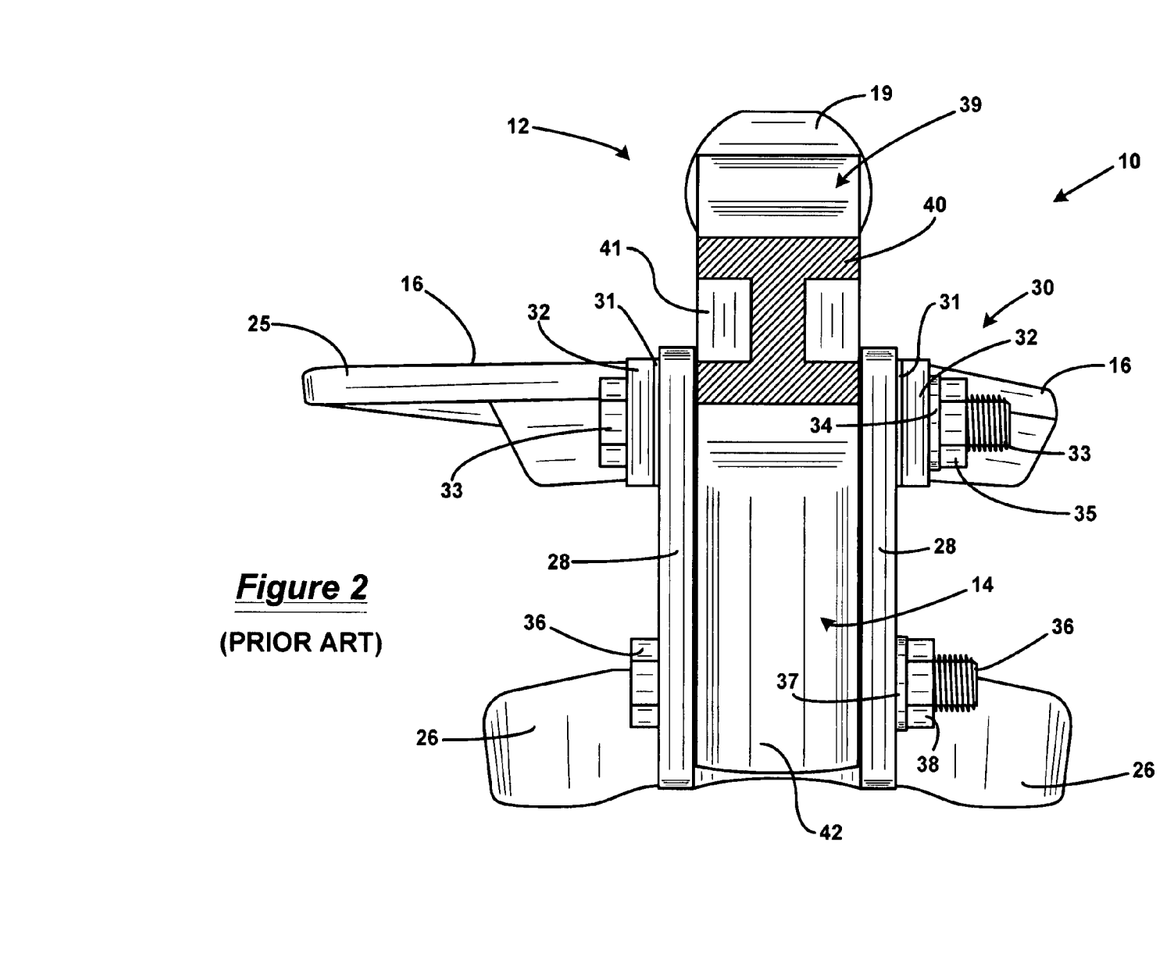
FIG. 2 shows, in an interior side elevational view, the prior art weight distribution type towing hitch assembly of FIG. 1.

As shown in FIGS. 1 and 2, a typical weight distribution hitch assembly 10 as known in the prior art generally comprises a weight distribution hitch head assembly 15 dependently attached to a weight distribution hitch shank assembly 39. The weight distribution hitch shank assembly 39, which generally comprises a riser 42 integral with, or welded or otherwise connected to, a drawbar 40, is dependently attached to the towing vehicle, typically to a hitch receiver tube (not shown) mounted to the towing vehicle bumper, frame or other appropriate rear structure. In particular, the drawbar 40 is inserted into the receiver tube and secured in place using a hitch pin (not shown), which in turn is locked in position with a spring clip, R-clip, lynchpin or the like (not shown).

As shown in FIG. 1, the riser 42 (which, particularly when installed in the inverted position, is alternatively referred to as a "drop") typically comprises a plurality of head assembly mounting holes 43. The weight distribution hitch head assembly 15, which generally comprises an upper platform 16, a lower platform 26 and a plurality of wings 28 interconnecting the upper platform 16 and the lower platform 26 and being adapted to generally operate in the fashion of a clevis, is adjustably mounted to the weight distribution shank assembly 39 by securing the wings 28 of the head assembly 15 about the riser 42 of the shank assembly 39. In particular, as shown in FIGS. 1 and 2, the head assembly 15 is typically conventionally secured in place on and about the riser 42 of the shank assembly 39 with an upper attachment bolt 33, held in place with a corresponding lock washer 34 and nut 35 combination, and with a lower attachment bold 36, likewise held in place with a corresponding lock washer 37 and nut 38 combination.

As also shown in the figures, however, the foregoing attachment hardware also cooperates with other provisions to form a tilt control assembly 30, as is necessary for proper setup and adjustment of the weight distribution hitch assembly 10. In particular, such a tilt control assembly 30 is typically implemented by the provision of a plurality of serrated washer plate 31 formed integral with or affixed to the outer faces 29 of the wings 28 of the head assembly 15 and cooperatively adapted to fixedly engage with provided serrated washers 32. As is known to those of ordinary skill in the art, the tilt of the head assembly 15 is controlled by rotating the head assembly 15 about the loosely fitted lower attachment bolt 36 and, when in the desired position, engaging the serrated washers 32 with the correspondingly serrated washer plates 31 and, thereafter, tightening the nut 35 of the upper attachment bolt 33 and the nut 38 of the lower attachment bolt 36.

In a typical implementation of a weight distribution hitch assembly 10, the upper platform 16 of the head assembly 15 comprises a plurality of upper sockets 17 and that the lower platform 26 of the head assembly 15 comprises a plurality of lower sockets 27, which sockets 17, 27 are cooperatively adapted for the attachment of spring bar trunnions or the like (not shown) in a manner well known to those of ordinary skill in the art. Additionally, the upper platform 16 is typically provided with a ball hole 18 for the attachment of a conventional hitch ball 19, which generally comprises a threaded shank 21 extending from a shoulder 20, which shank 21 is secured in place in the ball hole 18 with conventional ball mounting hardware 22 such as the nut 23 and lock washer 24 combination shown in the figures. Finally, the upper platform 16 of a typical weight distribution hitch head assembly 15 commonly comprises one or more sway control attachment tabs 25 for connecting to and use of an independent friction style sway control apparatus (not shown).

As previously mentioned, the described prior art combination represents a great improvement over its prior art, particularly when provided with the many described features as generally facilitate proper setup and use. Unfortunately, however, the particular structures that enable the advantages of weight distribution type hitch assemblies also contribute or give rise to disadvantages or other shortcomings. For example, the greater structure as described necessarily results in a generally very heavy assembly. Compounding this issue, the somewhat complicated setup and adjustment procedure necessary for proper and safe utilization generally dictates that once configured for a particular towing configuration the assembled combination 10 of the head assembly 15 and the shank assembly 39 will not be disassembled. Because such weight distribution hitch assemblies are often utilized with recreational trailers and the like, which in turn are widely utilized by retirees who are typically more likely than the general population to be lacking in physical strength, some efforts have been made to address excess weight. For example, as shown in FIGS. 1 and 2, the weight distribution hitch shank assembly 39 may be provided with side recesses 41 along the drawbar 40 or a central recess 44 through the shank 44, each of which provides at least some weight reduction.

While, as discussed above, some disadvantages or shortcomings of these assemblies can be at least partially addressed, the solutions themselves are known to contribute to other disadvantages which have not been adequately addressed. For example, the described recesses 41, 44 provide areas for the collection of heavy grease (as must be applied to various portions of the assembly), which areas are generally inaccessible for cleaning. Additionally, the described sockets 17, 27, serrated washer plates 31, serrated washers 32, various bolts and the like 21, 33, 36 and other areas such as, for example the area between the wings 28, also result collection points for grease that are generally not readily accessible for cleaning. As a result, the enjoyment of a recreational trailer or the like is often tempered by the frustration of completely destroyed clothing.

Still further, it is noted that the functional requirements of many of the described structures dictate that the same be constructed in such a manner as to result in many protuberances not generally associated with an ordinary hitch assembly. For example, the described sockets 17, 27, various bolts and the like 21, 33, 36, and sway control attachment tabs 25 all generally present sharp corners. Because of this, the enjoyment of a recreational trailer or the like is often further tempered by scraped shins and the like. Still further, these structures are generally located at just the right height for striking playing children.

Although the hitch assembly 10 could of course be removed from the towing vehicle while at a campsite, thereby reducing some of these disadvantages, the weight of such an assembly 10 generally makes this a less than attractive solution. Additionally, the unwieldy shape taken by such assemblies has heretofore precluded development of a cover structure that could be fitted to such an assembly in a manner that addresses the foregoing disadvantages. As a result, it is an overriding object of the present invention to improve over the prior art by providing a protective cover for use in connection with a weight distribution type towing hitch assembly that may be securely applied to the hitch assembly regardless of the adjustment of the assembly and that simultaneously provides protection against both damage to clothing and injury from inadvertent impact. Additionally, it is an object of the present invention to provide such a protective cover that is readily and economically manufacturable, thereby being available to the widest array of users. Finally, it is also an object of the present invention to provide such a protective cover that is generally durable and weatherable, the advantages thereof thereby being available regardless of weather conditions and the like.

SUMMARY OF THE INVENTION

In accordance with the foregoing objects, the present invention—a protective cover for use in connection with a weight distribution type towing hitch assembly—generally comprises means for encasing a weight distribution type towing hitch assembly, said means for encasing comprising means for preventing contact injury to passersby; and means for containing grease associated with the weight distribution type towing assembly; and means for securing said protective cover to the weight distribution type towing assembly.

In the most preferred implementation of the present invention, the cover generally comprises a laminate of an outer layer, a grease barrier and a cushion preferably located between the outer layer and the grease barrier. The outer layer of the protective cover forms a plurality of attachment flaps, which, in accordance with the present invention, are provided and arranged such that in addition to providing a means for securing the protective cover to a weight distribution type hitch assembly also at least in part provide a means for containing grease associated with a weight distribution type hitch assembly, thereby preventing the soiling of clothing and the like.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein:

FIG. 5 is depicted in dotted line, but which is depicted in detail in FIGS. 1 and 2.

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Figure 3:
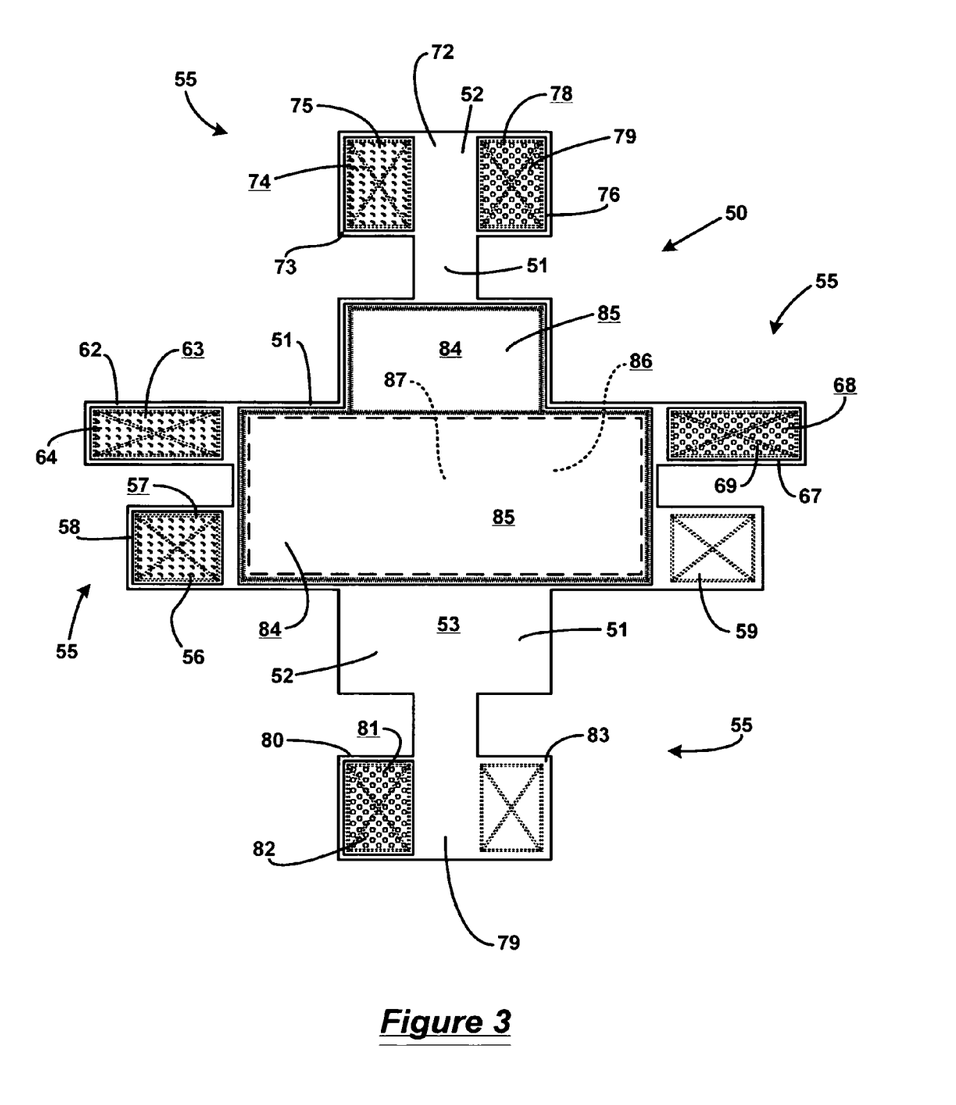
FIG. 3 shows, in a plan view, the interior side of the preferred implementation of the protective cover of the present invention as prepared prior to final assembly for use.
Figure 4:
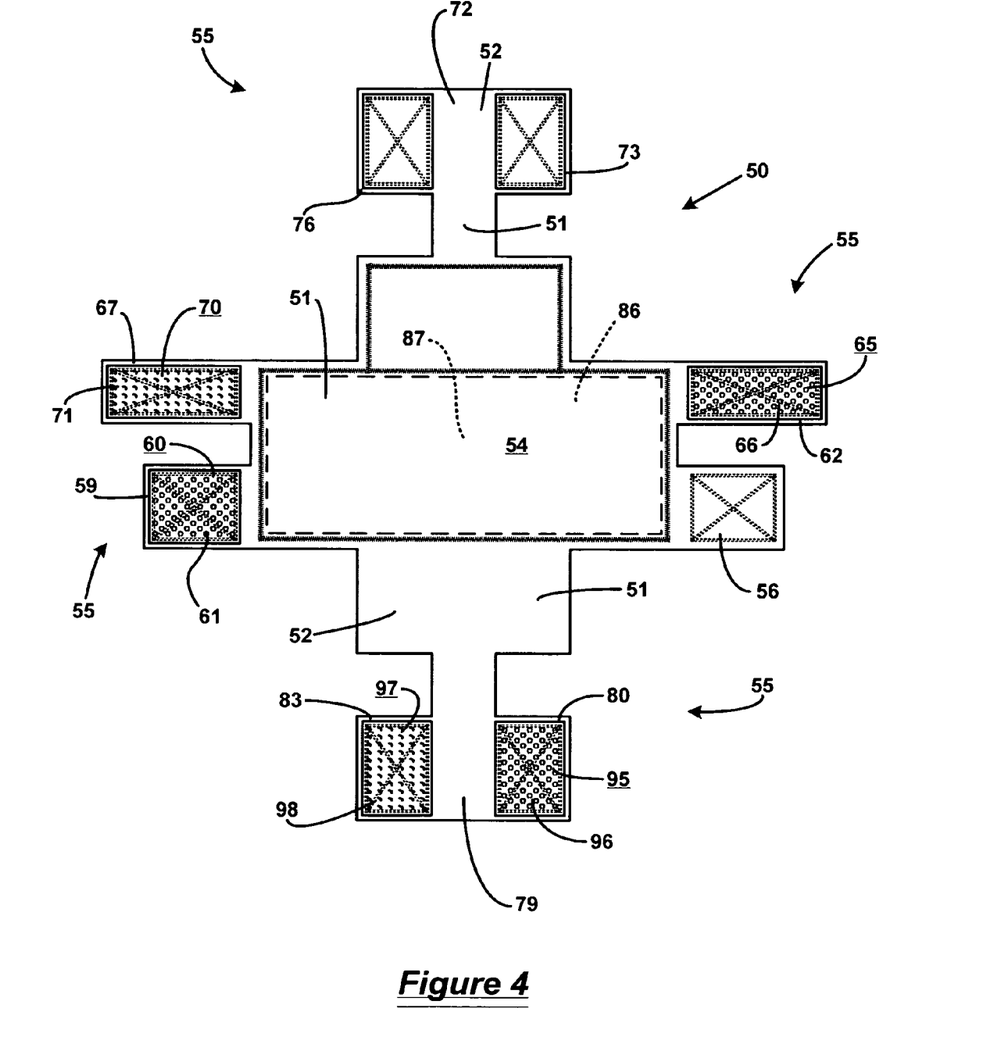
FIG. 4 shows, in a plan view, the exterior side of the preparation of FIG. 3.
Figure 5:
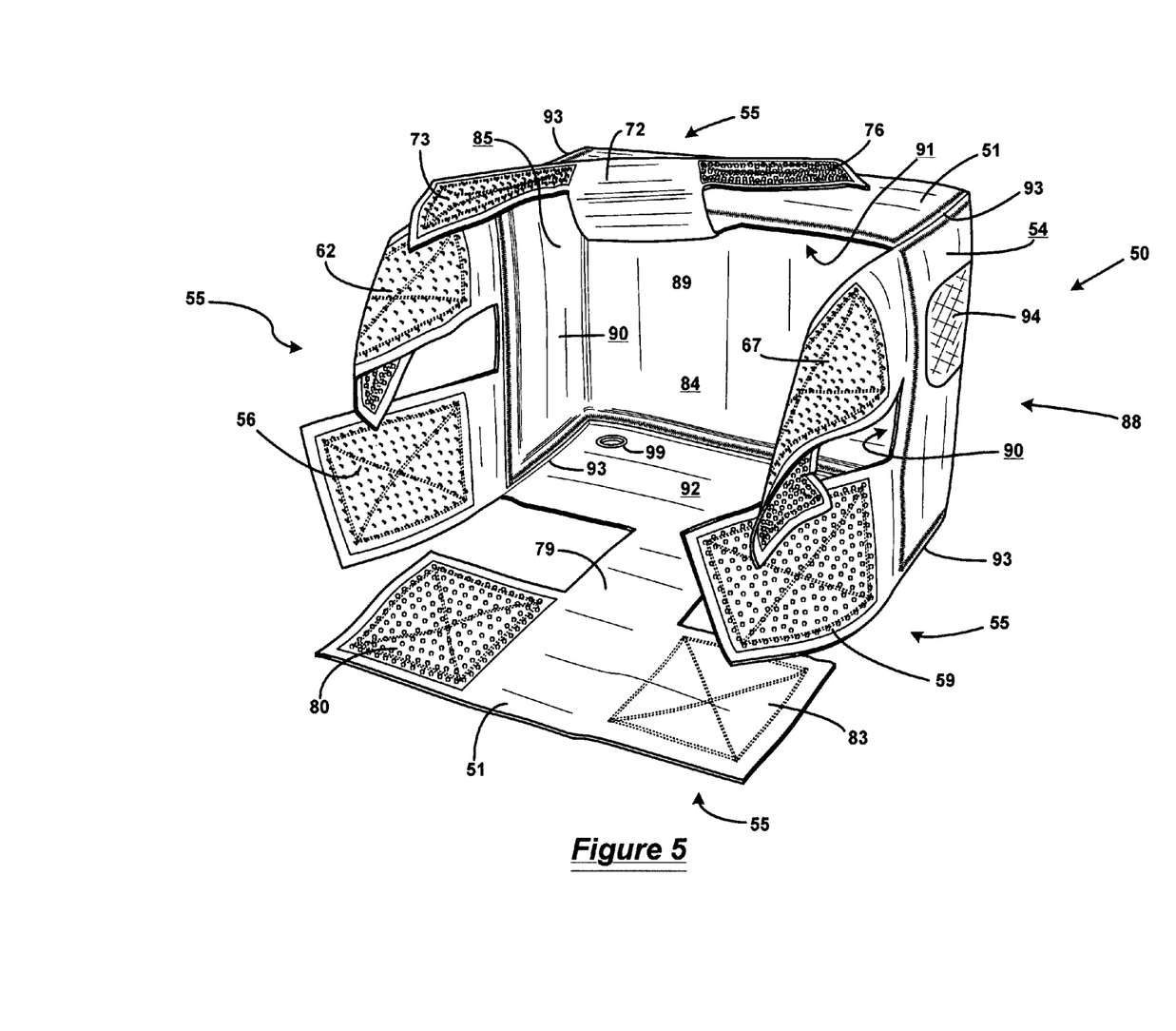
FIG. 5 shows, in a perspective view, the preferred implementation of the protective cover of the present invention as finally assembled for use in connection with a weight distribution type towing hitch assembly.

Referring now to FIGS. 3 through 5, in particular, a protective cover 50 for use on and in connection with a weight distribution type hitch assembly 10, as constructed according to the most preferred implementation of the present invention, is shown to generally comprise a laminate of an outer layer 51, a grease barrier 84 and a cushion 86 preferably located between the outer layer 51 and the grease barrier 84. As will be better understood further herein, the outer layer 51 of the protective cover 50 forms a plurality of attachment flaps 55, which, in accordance with the present invention, are provided and arranged such that in addition to providing a means for securing the protective cover 50 to a weight distribution type hitch assembly 10 also at least in part provide a means for containing grease associated with a weight distribution type hitch assembly 10, thereby preventing the soiling of clothing and the like.

The outer layer 51 of the protective cover 50 is primarily adapted as a means for encasing the extending structures of a weight distribution type hitch assembly 10, which extending structures are herein defined as comprising the outer structures 11, the upper portion, the lower portion 13 and the interior surfaces 14 of the weight distribution type hitch assembly 10, as particularly shown and identified in FIGS. 1 and 2. As a result of this principle purpose, the outer layer 51 of the protective cover 50 is preferably manufactured from a relatively pliable material in order to conform to and about these extending structures, which, as noted in the discussion of the Background of the Invention, may on the whole take a wide variety of actual shapes. Although with the teachings of the present exemplary description in aid, those of ordinary skill in the art will recognize many other substantially equivalent materials, the preferred implementation of the outer layer 51 as manufactured in accordance with the present invention comprises a sheet 52 of preferably non-elastic nylon, polypropylene or like material such as exhibit not only the desired pliability, but also are materials generally known to be highly weatherable as well as tear resistant. Additionally, many such materials are also susceptible to radio frequency ("RF") and other heat welding manufacturing techniques in addition to common sewing and the like, which, as will be apparent to those of ordinary skill in the art, expands the available techniques for efficient manufacture of the present invention.

Although the outer layer 51 of the protective cover 50 generally must comprise a very pliable material, especially considering its dual purpose of implementing a means for securing the protective cover 50 to a weight distribution type hitch assembly 10 in addition to implementing a means for containing grease associated with a weight distribution type hitch assembly 10 and otherwise encasing the extending structures of a weight distribution type hitch assembly 10, the grease barrier 84, the purpose of which is generally limited to the role of forming in part the means for containing grease associated with a weight distribution type hitch assembly 10, need not be so adaptable as the outer layer 51 and, therefore, may be and is desirably constructed of more resilient material than selected for the outer layer 51. In the most preferred implementation of the protective cover 50 of the present invention, it is found that the grease barrier 84 may comprise a sheet 85 of polymer coated textile such as, for example, polyvinyl chloride ("PVC") coated polyester, biaxially-oriented polyethylene terephthalate ("boPET") such as, for example, the material commercially available from E.I. du Pont de Nemours Company under the well-known trademark "MYLAR" or a like material. As will be appreciated by those of ordinary skill in the art, such materials are generally known to be highly impenetrable to grease and the like and, additionally, are also susceptible to RF and other heat welding manufacturing techniques in addition to common sewing and the like.

In order to provide the protective cover 50 of the present invention with a means for preventing contact injury of the nature discussed in the Background of the Invention, the preferred implementation of the present invention further comprises a cushion 86 as previously mentioned. Because, as will be better understood further herein, the provided cushion 86 is generally positioned between the interiorly located grease barrier 84 and the less waterproof outer layer 51, it is desirable that the cushion 86 be manufactured of generally hydrophobic foam or like material. In the most preferred implementation of the present invention, therefore, the cushion 86 preferably comprises a layer 87 of polyethylene, polyurethane or like foam such as, for example, that generally described in U.S. Pat. No. 6,747,068 issued Jun. 8, 2004 to Kelly, which by this reference is incorporated herein as though now set forth in its entirety.

Referring again to the referenced figures, but additionally to the foregoing discussion of intended function, it is noted that the grease barrier 84 as preferably implemented comprises a sheet 85 sized and shaped such that in the fully assembled protective cover 50, which generally will take an open box structure 88 as particularly depicted in FIG. 5, the grease barrier 84 generally conforms to the extents of back 89 and sides 90 of the box structure 88, which areas 89, 90 present the highest risk for contact between grease associated with a weight distribution type hitch assembly 10 and the clothing of a passerby. Additionally, though, the grease barrier 84 may extend into the area of the top 91 of the box structure or other areas, noting however that overextension into the attachment flaps 55 and/or the bottom 92 of the box structure will, depending on the type of material selected for the sheet 85 of the barrier 84, impede conformation of the outer layer 51 of the protective cover 50 about a weight distribution type hitch assembly 10 in its role as a means for encasing a weight distribution type hitch assembly 10 and/or impede use of the attachment flaps 55 in their role as a means for securing the protective cover 50 to a weight distribution type hitch assembly 10 (described in greater detail further herein). Although more design choice is available in the sizing and shaping of the cushion 86, the preferred implementation of the present invention comprises a sheet 87 having a perimetrical size and shape slightly less than that of the grease barrier 84. In this manner, the sheet 87 of material forming the cushion 86 may be "sandwiched" between the inner surface 53 of the outer layer 51 and held securely in place by the stitching (shown in FIGS. 3 through 5 about the perimeter of and, between the back 89 and top 91 of the box structure 88, through the grease barrier 84), RF or other head welding, or substantially equivalent securement utilized to affix the grease barrier 84 to the inner surface 53 of the outer layer 51 of the protective cover 50.

In any case, as previously mentioned, the outer layer 51 of the protective cover 50 forms a plurality of attachment flaps 55 providing a means for securing the protective cover 50 to a weight distribution type hitch assembly 10 as well as, at least in part, a means for encasing a weight distribution type hitch assembly 10. Although, as will be better understood further herein, many aspects of this present exemplary only description are susceptible to modification (as will be discussed in greater detail further herein), it is deemed critical to the present invention that the attachment flaps 55 as described in the following discussion be provided, sized and shaped such that they are capable of performing their described dual roles as forming a means for securing the protective cover 50 to a weight distribution type hitch assembly 10 and, at least in part, as a means for encasing a weight distribution type hitch assembly 10. In particular, it is deemed critical to the present invention that attachment flaps 55 as now described be adapted to embrace the drawbar 40 of a weight distribution type hinge assembly 10 generally in the manner as described in the following detailed discussions.

In order to serve the critical aspects of the present invention, the protective cover 50 is shown to comprise a lower, left side flap 56 and a generally corresponding lower, right side flap 59; an upper, left side flap 62 and a generally corresponding upper, right side flap 67; a top flap 72 having a left wing 73 and a generally corresponding right wing 76; and a bottom flap 79 having a left wing 80 and a generally corresponding right wing 83. Additionally, the variously provided flaps and/or wings thereof must be provided with corresponding securements for mating their various surfaces one to another as described further herein. It is noted, however, that while the provision of such securements is a critical aspect of the present invention, the particular implementations may be widely varied as discussed further herein. In any case, in the exemplary only embodiment as depicted in the figures, the required securements are implemented as follows: a patch 58 of hook type fastener material is affixed or otherwise provided on the interior face 57 of the lower, left side flap 56; a patch 61 of loop type fastener material is affixed or otherwise provided on the exterior face 60 of the lower, right side flap 59; a patch 64 of hook type fastener material is affixed or otherwise provided on the interior face 63 of the upper, left side flap 62; a patch 66 of loop type fastener material is affixed or otherwise provided on the exterior face 65 of the upper, left side flap 62; a patch 69 of loop type fastener material is affixed or otherwise provided on the interior face 68 of the upper, right side flap 67; a patch 71 of hook type fastener material is affixed or otherwise provided on the exterior face 70 of the upper, right side flap 67; a patch 75 of hook type fastener material is affixed or otherwise provided on the interior face 74 of the left wing 73 of the top flap 72; a patch 78 of loop type fastener material is affixed or otherwise provided on the interior face 77 of the right wing 76 of the top flap 72; a patch 82 of loop type fastener material is affixed or otherwise provided on the interior face 81 of the left wing 80 of the bottom flap 79; a patch 96 of loop type fastener material is affixed or otherwise provided on the exterior face 95 of the left wing 80 of the bottom flap 79; and a patch 98 of hook type fastener material is affixed or otherwise provided on the exterior face 97 of the right wing 83 of the bottom flap 79. In any case, the preparations as depicted in FIGS. 3 and 4 are finally assembled into the open box structure 88, as depicted ready for use in FIG. 5, by sewing or otherwise securing the seams 93 between the sides 90 and the top 91 and bottom 92 as shown in FIG. 5.

Figure 6:
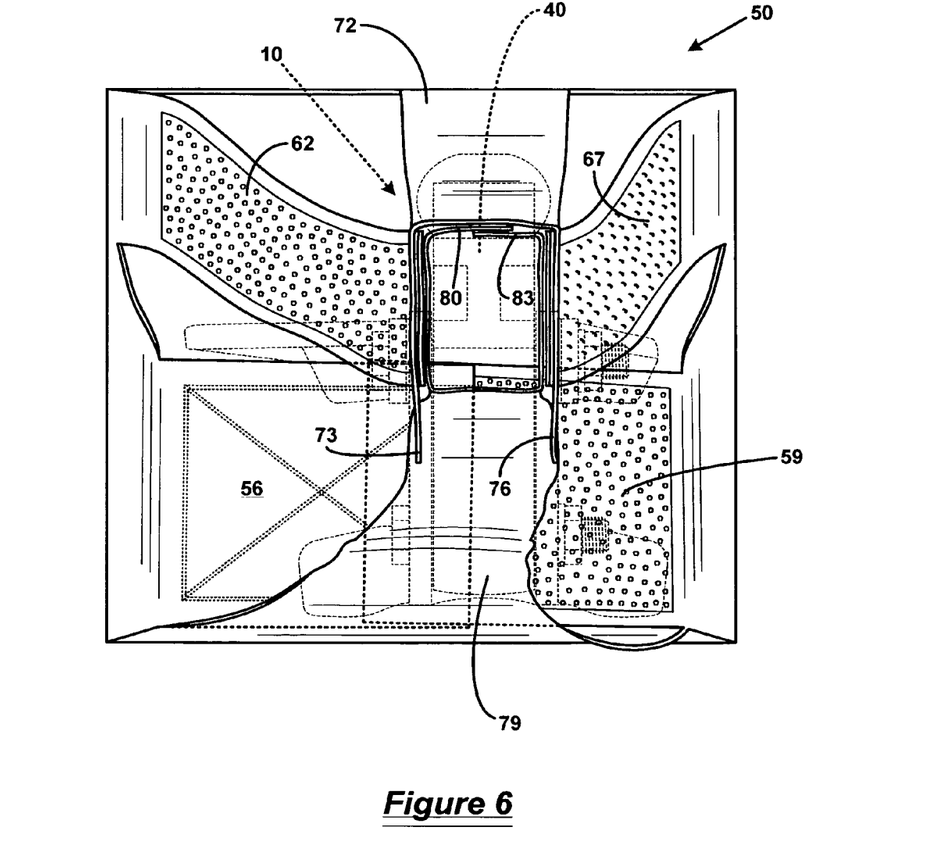
FIG. 6 shows, in an interior side elevational view generally corresponding to the view of FIG. 2, the protective cover of FIG. 5 as operably fitted on and about a typical weight distribution type towing hitch assembly, which in the present

Referring now in particular to FIG. 6 (but also with reference to FIGS. 1 through 5), the preferred method of application of the protective cover 50 as implemented according to the teachings of the present invention is shown to generally comprise placement of the previously described open box structure 88 over and about the outer structures 11 of a weight distribution type hitch assembly 10, which placement will generally also cause encasement of the upper portion 12 and lower portion 13 of the weight distribution type hitch assembly 10. With the box structure 88 in place as shown and described, the lower, right side flap 59 of the protective cover 50 is folded over the interior surfaces 14 of the hitch assembly 10 and then the lower, left side flap 56 is folded over the previously positioned lower, right side flap 59. Utilizing the positioning of the flaps 56, 59 to pull the sides 90 of the box structure inward toward the outer faces 29 of the wings 28 of the weight distribution hitch head assembly 15, the patch 58 of hook type fastener material provided on the interior face 57 of the lower, left flap 56 is pressed into and engaged with the patch 61 of loop type fastener material provided on the exterior face 60 of the lower, right side flap 59, thereby contributing to both the encasement by and the securement of the protective cover 50.

The lower, side flaps 56, 59 thus positioned, the bottom flap 79 is pulled upward and over the lower, side flaps 56, 59—pulling upward and/or deforming the bottom 92 of the box structure 88 as necessary depending on the particular configuration of the weight distribution type hitch assembly 10—until the wings 80, 83 of the bottom flap 79 are in close proximity to the drawbar 40 of the weight distribution hitch shank assembly 39. When so positioned, the right wing 83 of the bottom flap 79 is wrapped over and against the drawbar 40 and, while the right wing 83 is held in the described and depicted position, the left wing 80 of the bottom flap 79 is wrapped over and against both the right wing 83 and any remaining exposed adjacent area of the drawbar 40. In these described and depicted positions, the patch 82 of loop type fastener material provided on the interior face 81 of the left wing of the bottom flap 79 is pressed into and engaged with the patch 98 of hook type fastener material provided on the exterior face 97 of the right wing 83 of the bottom flap 79. As, with the aid of this exemplary detailed description, will be apparent to those of ordinary skill in the art, there will at this point in the application of the protective cover 50 remain exposed a considerable portion of the patch 98 of hook type fastener material provided on the exterior face 97 of the right wing 83 of the bottom flap 79 and there will be outwardly presented the patch 96 of loop type fastener material provided on the exterior face 95 of the left wing 80 of the bottom flap 79, notably in the areas over the respective sides of the drawbar 40.

At this stage in the preferred application, the upper, side flaps 62, 67 are in no particular order drawn inward toward the drawbar 40 to substantially enclose the remaining openings to the interior of the box structure 88. In particular, the upper, left side flap 62 is drawn snuggly downward toward the drawbar 40, in which position the patch 64 of hook type fastener material provided on the interior face 63 of the upper, left side flap 62 is pressed into and engaged with the patch 96 of loop type fastener material provided on the exterior face 95 of the left wing 80 of the bottom flap 79. Likewise, the upper, right side flap 67 is drawn snuggly downward toward the drawbar 40, in which position the patch 71 of loop type fastener material provided in the interior face 68 of the upper, right side flap 67 is pressed into and engaged with the patch 98 of hook type fastener material provided on the exterior face 97 of the right wing 83 of the bottom flap 79. In accordance with the teachings of the present invention, this stage of application (in similar fashion to the previous stage) again leaves fastener materials exposed in the areas over the sides of the drawbar 40. In particular, as particularly shown in FIG. 6, there will at this stage be presented along the first side of the drawbar 40 the patch 66 of loop type fastener material provided on the exterior face 65 of the upper, left side flap 62 and there will be presented along the second, opposite side of the drawbar 40 the patch 71 of hook type fastener material provided on the exterior face 70 of the upper, right side flap 67.

To complete the securement of the protective cover 50 over and about the weight distribution type towing hitch assembly 10 as well as to substantially encase any remaining exposed extending structures of the weight distribution type hitch assembly 10, the top flap 72 of the protective cover 50 is then drawn downward toward the drawbar 40. As so positioned, but in no particular order, the patch 75 of hook type fastener material provided on the interior face 74 of the left wing 73 of the top flap is pressed into an engaged with the patch 66 of loop type fastener material provided on the exterior face 65 of the upper, left side flap 62 and the patch 78 of loop type fastener material provided on the interior face 77 of the right wing 76 of the top flap is pressed into and engaged with the patch 71 of hook type fastener material provided on the exterior face 70 of the upper, right side flap 67.

Manufactured and applied as shown and described or in a substantially equivalent fashion, the protective cover 50 of the present invention thus provides an effective means for encasing a weight distribution type towing hitch assembly 10, said means for encasing including both a means for means for preventing contact injury to passersby as well as a means for containing grease associated with a weight distribution type hitch assembly 10, thereby preventing the soiling of clothing and the like, the protective cover 50 being provided also with an effective means for securing the protective cover 50 to the weight distribution type towing hitch assembly 10.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, as previously discussed, those of ordinary skill in the art will recognize that the critical aspects of the present invention may be implemented without adhering to every detail of implementation as set forth herein. For example, hook type fastener material may be substituted for loop type fastener material and the like and/or the particular order of application may be largely altered so long as the layered type application as generally described may ultimately be achieved.

Additionally, those of ordinary skill in the art will recognize that in order to further increase the safety measures provided by the described protective cover 50, a reflective tape 94 or the like may be sewn, welded or otherwise affixed to the outer surface 54 of the outer layer 51 of the protective cover 50 of the present invention. Still further, those of ordinary skill in the art will—in light of this exemplary detailed description—recognize that one or more moisture drains 99, such as may be implemented with a grommet about a hole or the like, may be combined with the other teachings of the present invention to ensure that any moisture as may enter the cover will drain out, thereby preventing rusting or the like of an encased weight distribution type towing hitch assembly. In any case, because the scope of the present invention is much broader than any particular embodiment, the foregoing detailed description should not be construed as a limitation of the scope of the present invention, which is limited only by the claims appended hereto.

What is claimed is:

1. A protective cover for use in connection with a weight distribution type towing hitch assembly as mounted to a drawbar, said protective cover comprising:
    means for encasing a weight distribution type towing hitch assembly, said means for encasing comprising:
        an open box structure having a back, a first side, a top, a second side, and a bottom;
        means for preventing contact injury to passersby; and
        means for containing grease associated with the weight distribution type towing assembly; and
    means for securing said protective cover to the weight distribution type towing assembly, said means for securing comprising:
        a lower, left side flap attached to and extending from said first side of said open box;
        a lower, right side flap attached to an extending from said second side of said open box, said lower, right side flap generally corresponding in size and shape to said lower, left side flap;
        an upper, left side flap attached to and extending from said first side of said open box;
        an upper, right side flap attached to an extending from said second side of said open box, said upper, right side flap generally corresponding in size and shape to said upper, left side flap;
        a bottom flap attached to and extending from said bottom of said open box, said bottom flap having a left wing and a generally corresponding right wing;
        a top flap attached to and extending from said top of said open box, said top flap having a left wing and a generally corresponding right wing; and
    wherein:
        said lower, left side flap and said lower, right side flap are cooperatively adapted to fold about and encase the interior surfaces of the weight distribution type towing assembly;
        said left wing of said bottom flap and said right wing of said bottom flap are cooperatively adapted to wrap about the drawbar and engage one to the other such that said bottom flap is pulled over and about said lower, left side flap and said lower, right side flap as encasing the interior surfaces of the weight distribution type towing assembly;
        said upper, left side flap is adapted to engage with said left wing of said bottom flap as wrapped about the drawbar and said upper, right side flap is adapted to engage with said right wing of said bottom flap as wrapped about the drawbar; and
        said left wing of said top flap is adapted to engage with said upper, left side flap as positioned on the drawbar and said right wing of said top flap is adapted to engage with said upper, left side flap as positioned on the drawbar;
    such that the interior of said box structure is substantially enclosed by the cooperative positioning of said flaps and said wings.

2. The protective cover as recited in claim 1, wherein said means for securing comprises hook and loop type fasteners.

3. The protective cover as recited in claim 2, wherein said means for encasing comprises a nylon sheet.

4. The protective cover as recited in claim 3, wherein said means for containing grease comprises a sheet of polymer coated textile.

5. The protective cover as recited in claim 4, wherein said means for preventing contact injury comprises a layer of polyethylene foam.

6. The protective cover as recited in claim 4, wherein said means for preventing contact injury comprises a layer of polyurethane foam.

7. The protective cover as recited in claim 3, wherein said means for containing grease comprises a sheet of biaxially-oriented polyethylene terephthalate.

8. The protective cover as recited in claim 7, wherein said means for preventing contact injury comprises a layer of polyethylene foam.

9. The protective cover as recited in claim 7, wherein said means for preventing contact injury comprises a layer of polyurethane foam.

10. The protective cover as recited in claim 2, wherein said means for encasing comprises a polypropylene sheet.

11. The protective cover as recited in claim 10, wherein said means for containing grease comprises a sheet of polymer coated textile.

12. The protective cover as recited in claim 11, wherein said means for preventing contact injury comprises a layer of polyethylene foam.

13. The protective cover as recited in claim 11, wherein said means for preventing contact injury comprises a layer of polyurethane foam.

14. The protective cover as recited in claim 10, wherein said means for containing grease comprises a sheet of biaxially-oriented polyethylene terephthalate.

15. The protective cover as recited in claim 14, wherein said means for preventing contact injury comprises a layer of polyethylene foam.

16. The protective cover as recited in claim 14, wherein said means for preventing contact injury comprises a layer of polyurethane foam.

* * * * *